US009914825B2

(12) United States Patent
Peterson et al.

(10) Patent No.: US 9,914,825 B2
(45) Date of Patent: Mar. 13, 2018

(54) MODIFIED HETEROPHASIC POLYOLEFIN COMPOSITION (71) Applicant: MILLIKEN & COMPANY, Spartanburg, SC (US)

(72) Inventors: Joseph J. Peterson, Simpsonville, SC (US); Scott R. Trenor, Greenville, SC (US); Jason D. Sprinkle, Woodruff, SC (US)

(73) Assignee: Milliken & Company, Spartanburg, SC (US)

( * ) Notice: Subject to any disclaimer, the term of this patent is extended or adjusted under 35 U.S.C. 154(b) by 167 days.

(21) Appl. No.: 14/937,349

(22) Filed: Nov. 10, 2015

(65) Prior Publication Data

US 2016/0145426 A1 May 26, 2016

Related U.S. Application Data (60) Provisional application No. 62/084,793, filed on Nov. 26, 2014.

(51) Int. Cl.
| | | |
|---|---|---|
| *C08L 23/10* | (2006.01) | |
| *C08L 23/04* | (2006.01) | |
| *C08K 5/00* | (2006.01) | |
| *C08K 5/38* | (2006.01) | |
| *C08K 5/39* | (2006.01) | |
| *C08L 23/12* | (2006.01) | |

(52) U.S. Cl.
CPC ............. *C08L 23/10* (2013.01); *C08K 5/005* (2013.01); *C08K 5/38* (2013.01); *C08K 5/39* (2013.01); *C08L 23/04* (2013.01); *C08L 23/12* (2013.01)

(58) Field of Classification Search
CPC .. C08K 5/005; C08K 5/38; C08K 5/39; C08L 23/12; C08L 23/04; C08L 23/10; C08L 23/0815; C08L 2205/08; C08L 2207/02
See application file for complete search history.

(56) References Cited

U.S. PATENT DOCUMENTS

| | | | |
|---|---|---|---|
| 3,301,837 A | 1/1967 | Bartorelli et al. | |
| 3,376,304 A | 4/1968 | Mohrbacher et al. | |
| 3,379,677 A | 4/1968 | Dressler et al. | |
| 5,369,159 A | 11/1994 | Nesuadba | |
| 5,428,162 A | 6/1995 | Nesuadba | |
| 5,639,822 A | 6/1997 | Hungenberg et al. | |
| 6,020,437 A | 2/2000 | Mestanza et al. | |
| 6,620,892 B1 | 9/2003 | Bertin et al. | |
| 6,992,225 B2 | 1/2006 | Grimaldi et al. | |
| 7,019,086 B2 | 3/2006 | Onoi et al. | |
| 7,196,144 B2 | 3/2007 | Ashiura et al. | |
| 7,544,743 B2 | 6/2009 | Ciardelli et al. | |
| 7,649,052 B2 | 1/2010 | Massari et al. | |
| 7,772,325 B2 | 8/2010 | Ashiura et al. | |
| 8,207,272 B2 | 6/2012 | Bernreitner et al. | |
| 8,246,880 B2 | 8/2012 | Kawabe et al. | |
| 8,557,926 B2 | 10/2013 | Kawazura et al. | |
| 8,618,224 B2 | 12/2013 | Horst et al. | |
| 9,410,035 B2* | 8/2016 | Peterson et al. ........ | C08L 23/26 |
| 2007/0145625 A1 | 6/2007 | Caronia et al. | |
| 2007/0200272 A1 | 8/2007 | Horst et al. | |
| 2010/0151156 A1 | 6/2010 | Kawabe et al. | |
| 2010/0168343 A1 | 7/2010 | Harris et al. | |
| 2011/0172368 A1 | 7/2011 | Stolz-Dunn | |
| 2012/0289620 A1 | 11/2012 | Deheunynck et al. | |
| 2015/0259453 A1* | 9/2015 | Peterson et al. ........ | C08L 23/10 |
| | | | 525/375 |
| 2016/0257810 A1* | 9/2016 | Peterson et al. ........ | C08L 23/26 |
| 2017/0073511 A1* | 3/2017 | Peterson et al. ........ | C08L 23/12 |

FOREIGN PATENT DOCUMENTS

| | | |
|---|---|---|
| CN | 101277997 A | 1/2008 |
| DE | 102013001014 A1 | 7/2013 |
| EP | 0 591 102 A1 | 9/1993 |
| EP | 1 354 901 B1 | 3/2006 |
| EP | 1 391 482 B1 | 5/2009 |
| EP | 2 615 135 A1 | 7/2013 |
| FR | 2 582 004 A1 | 5/1986 |
| JP | 2006333021 A | 12/2006 |
| JP | 2008145739 A | 6/2008 |
| KR | S4729439 | 11/1972 |
| KR | 102008055879 | 6/2008 |
| WO | WO 2002/12204 A1 | 2/2002 |

(Continued)

OTHER PUBLICATIONS

PCT/US2015/019429 International Search Report, filed Mar. 9, 2015, 3 pages.
PCT/US2015/019429 Written Opinion of the International Searching Authority, Filed Mar. 9, 2015, 4 pages.
Wan, Dong et al., "*Controlling Degradation and Branching Reactions of Polypropylene by Different Heteroaromatic Ring Derivatives*" Elsevier, Polymer Degradation and Stability 97 (2012) 40-48.
Xing, Haiping et al., "*Effect of Leaving Group in Dithiocarbamates on Mediating Melt Radical Reaction During Preparing Long Chain Branched Polypropylene*" Elsevier, Polymer 53 (2012) 947-955.
Hyslop, David K. et al., "*Dynamics and Yields of AOTEMPO-Mediated Polyolefin Cross-Linking*"Queen's University, Kingston, Ontario, Canada.

(Continued)

*Primary Examiner* — Nathan M Nutter
(74) *Attorney, Agent, or Firm* — Robert M. Lanning (57) ABSTRACT A heterophasic polymer composition comprises a propylene polymer phase, an ethylene polymer phase, and a compatibilizing agent. The compatibilizing agent is a compound comprising at least one moiety conforming to the structure of Formula (I)

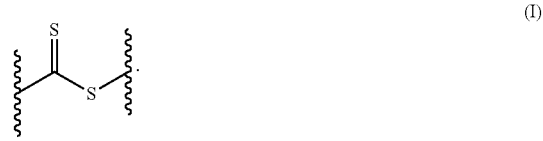

23 Claims, 4 Drawing Sheets (56) References Cited

FOREIGN PATENT DOCUMENTS

| WO | WO 2007043358 A1 | 4/2007 |
| WO | WO 2010/009825 A1 | 1/2010 |
| WO | WO 2014/014491 A1 | 1/2014 |
| WO | WO 2015/138300 A1 | 9/2015 |

OTHER PUBLICATIONS

Hyslop, David K. et al., "*Functional Nitroxyls for Use in Delayed-Onset Polyolefin Cross-Linking*" Department of Chemical Engineering, Queen's University, Kingston, Ontario, Canada, Macromolecules 2012, 45, 8147-8154.

Al Sagheer, Fakhreia A. et al., "*Investigation of Radiation-Grafted and Radiation-Modified N-Vinyl-2-Pyrrolidone onto Polypropylene Film*" Chemistry Department, Faculty of Science, Kuwait University. Journal of Applied Polymer Science, vol. 76, 282-289 (2000).

Khalil, Magda M. I., et al., "*Gamma-Irradiation Effects on the Thermal and Structural Characteristics of Modified, Grafted Polypropylene*" Journal of Applied Polymer Science, vol. 102, 506-515 (2006).

Wan, Dong et al., *Preparation and Characterization of Long Chain Branched Polypropylene Mediated by Different Heteroaromatic Ring Derivatives* Elsevier, Polymer 54 (2013) 639-651.

Zulli, Fabio, et al., "*Rheology of Long-Chain Branched Polypropylene Copolymers*" Journal of Applied Polymer Science.

Augier, Sylvain, et al., *Structure and Rheology of Polypropylene with Various Architectures Prepared by Coagent-Assisted Radical Processing* Polym Int 2010; 59: 1499-1505.

Lee, Chun D., "*Structure-Properly Relations in Visbroken (Peroxide Treated) Impact Polypropylene Copolymers*" Equistar Chemicals, A Lyondell Company.

\* cited by examiner

MODIFIED HETEROPHASIC POLYOLEFIN COMPOSITION

CROSS-REFERENCE TO RELATED PATENT APPLICATIONS

This application claims, pursuant to 35 U.S.C. § 119(e)(1), priority to and the benefit of the filing date of U.S. Patent Application No. 62/084,793 filed on Nov. 26, 2014, which application is hereby incorporated by reference in its entirety.

TECHNICAL FIELD OF THE INVENTION

The present invention is directed to heterophasic polyolefin compositions having increased melt flow rates, as well as high impact strength. Of particular interest are modified polypropylene impact copolymers.

BACKGROUND

The melt flow rate (MFR) of a polymer resin is a function of its molecular weight. In general, increasing the melt flow rate allows the resin to be processed at lower temperatures and to fill complex part geometries. Various prior art methods of increasing the melt flow rate involve melt-blending the resin in an extruder with a compound capable of generating free radicals, such as a peroxide. The weight average molecular weight of the polymer is reduced and the MFR is increased. Increasing the melt flow rate by decreasing the molecular weight of the polyolefin polymer, however, has been found in many cases to have a detrimental effect on the strength of the modified polymer. For example, decreasing the molecular weight of the polymer can significantly lower the impact resistance of the polymer. And this lowered impact resistance can make the polymer unsuitable for use in certain applications or end uses. Accordingly, when extant technologies are utilized, one must strike a compromise between increasing the melt flow rate and undesirably decreasing the impact resistance of the polymer. This compromise often means that the melt flow rate is not increased to the desired level, which requires higher processing temperatures and/or results in lower throughputs.

A need therefore remains for additives and processes that can produce polymer compositions having an increased melt flow while preserving, or even improving, the impact resistance of the polymer.

BRIEF SUMMARY OF THE INVENTION

The invention generally provides heterophasic polymer compositions comprising a propylene polymer phase and an ethylene polymer phase. A compatibilizing agent is also added to the compositions. The addition of the compatibilizing agent to the compositions has been observed to preserve, or even improve, the impact resistance of the polymer composition when the melt flow rate of the polymer composition is increased by the use of a free radical generator.

Thus, in a first embodiment, the invention provides a heterophasic polymer composition comprising:
(a) a propylene polymer phase comprising propylene polymers selected from the group consisting of polypropylene homopolymers and copolymers of propylene and up to 50 wt. % of one or more comonomers selected from the group consisting of ethylene and $C_4$-$C_{10}$ α-olefin monomers;
(b) an ethylene polymer phase comprising ethylene polymers selected from the group consisting of ethylene homopolymers and copolymers of ethylene and one or more $C_3$-$C_{10}$ α-olefin monomers; and
(c) a compatibilizing agent, wherein the compatibilizing agent is a compound comprising at least one moiety conforming to the structure of Formula (I)

(I)

In a second embodiment, the invention provides a heterophasic polymer composition comprising a continuous phase comprising polypropylene polymers selected from the group consisting of polypropylene homopolymers and copolymers of propylene and up to 80 wt. % of one or more comonomers selected from the group consisting of ethylene and $C_4$-$C_{10}$ α-olefin monomers and a discontinuous phase comprising elastomeric ethylene copolymers having an ethylene content of from 8 to 90 wt. % selected from the group consisting of copolymers of ethylene and one or more $C_3$-$C_{10}$ α-olefin monomers, provided that the propylene content of the propylene polymer phase is greater than the propylene content of the ethylene polymer phase, wherein the composition further comprises propylene polymers bonded to ethylene copolymers by a compatibilizing agent, wherein the compatibilizing agent is a compound comprising at least one moiety conforming to the structure of Formula (I)

(I)

In a third embodiment, the invention provides a heterophasic polyolefin polymer composition obtained by the process comprising the steps of:
(a) providing a propylene polymer phase comprising propylene polymers selected from the group consisting of polypropylene homopolymers and copolymers of propylene and up to 50 wt. % of one or more comonomers selected from the group consisting of ethylene and $C_4$-$C_{10}$ α-olefin monomers and an ethylene polymer phase comprising ethylene polymers selected from the group consisting of ethylene homopolymers and copolymers of ethylene and one or more $C_3$-$C_{10}$ α-olefin monomers provided that the ethylene content of the ethylene polymer phase is at least 8 wt. %,
(b) providing a compatibilizing agent, wherein the compatibilizing agent is a compound comprising at least one moiety conforming to the structure of Formula (I)

(I)

and (c) mixing the propylene polymer phase, the ethylene polymer phase and the compatibilizing agent in the presence of free carbon radicals, whereby propylene polymers are bonded to ethylene polymers by the compatibilizing agent, and whereby the propylene polymer phase and the ethylene polymer phase form a heterophasic composition.

In a fourth embodiment, the invention provides a method of making a heterophasic polyolefin polymer composition, the method comprising the steps of:

(a) providing a propylene polymer phase comprising propylene polymers selected from the group consisting of polypropylene homopolymers and copolymers of propylene and up to 50 wt. % of one or more comonomers selected from the group consisting of ethylene and $C_4$-$C_{10}$ α-olefin monomers, and an ethylene polymer phase comprising ethylene polymers selected from the group consisting of ethylene homopolymers and copolymers of ethylene and one or more $C_3$-$C_{10}$ α-olefin monomers provided that the ethylene content of the ethylene polymer phase is at least 8 wt. %, (b) providing a compatibilizing agent, wherein the compatibilizing agent is a compound comprising at least one moiety conforming to the structure of Formula (I)

(I)

and (c) mixing the propylene polymer phase, the ethylene polymer phase and the compatibilizing agent, in the presence of free carbon radicals, whereby the compatibilizing agent reacts with propylene polymers and ethylene polymers thereby bonding propylene polymers to ethylene polymers, and whereby the propylene polymer phase and the ethylene polymer phase form a heterophasic composition.

DETAILED DESCRIPTION OF THE INVENTION

The following definitions are provided to define several of the terms used throughout this application.

As used herein, the term "substituted alkyl groups" refers to univalent functional groups derived from substituted alkanes by removal of a hydrogen atom from a carbon atom of the alkane. In this definition, the term "substituted alkanes" refers to compounds derived from acyclic unbranched and branched hydrocarbons in which (1) one or more of the hydrogen atoms of the hydrocarbon is replaced with a non-hydrogen atom (e.g., a halogen atom) or a non-alkyl functional group (e.g., a hydroxy group, aryl group, or heteroaryl group) and/or (2) the carbon-carbon chain of the hydrocarbon is interrupted by an oxygen atom (as in an ether), a nitrogen atom (as in an amine), or a sulfur atom (as in a sulfide).

As used herein, the term "substituted cycloalkyl groups" refers to univalent functional groups derived from substituted cycloalkanes by removal of a hydrogen atom from a carbon atom of the cycloalkane. In this definition, the term "substituted cycloalkanes" refers to compounds derived from saturated monocyclic and polycyclic hydrocarbons (with or without side chains) in which (1) one or more of the hydrogen atoms of the hydrocarbon is replaced with a non-hydrogen atom (e.g., a halogen atom) or a non-alkyl functional group (e.g., a hydroxy group, aryl group, or heteroaryl group) and/or (2) the carbon-carbon chain of the hydrocarbon is interrupted by an oxygen atom, a nitrogen atom, or a sulfur atom.

As used herein, the term "substituted aryl groups" refers to univalent functional groups derived from substituted arenes by removal of a hydrogen atom from a ring carbon atom. In this definition, the term "substituted arenes" refers to compounds derived from monocyclic and polycyclic aromatic hydrocarbons in which one or more of the hydrogen atoms of the hydrocarbon is replaced with a non-hydrogen atom (e.g., a halogen atom) or a non-alkyl functional group (e.g., a hydroxy group).

As used herein, the term "heterocyclyl groups" refers to univalent functional groups derived from heterocyclic compounds by removal of a hydrogen atom from an atom in the cyclic portion of the heterocyclic compound. In this definition, the term "heterocyclic compounds" refers to compounds derived from non-aromatic, monocyclic and polycyclic compounds having a ring structure composed of atoms of at least two different elements. These heterocyclic compounds can also comprise one or more double bonds.

As used herein, the term "substituted heterocyclyl groups" refers to univalent functional groups derived from substituted heterocyclic compounds by removal of a hydrogen atom from an atom in the cyclic portion of the compound. In this definition, the term "substituted heterocyclic compounds" refers to compounds derived from non-aromatic, monocyclic and polycyclic compounds having a ring structure composed of atoms of at least two different elements where one or more of the hydrogen atoms of the cyclic compound is replaced with a non-hydrogen atom (e.g., a halogen atom) or a functional group (e.g., hydroxy group, alkyl group, aryl group, heteroaryl group). These substituted heterocyclic compounds can also comprise one or more double bonds. As used herein, the term "substituted heteroaryl groups" refers to univalent functional groups derived from substituted heteroarenes by removal of a hydrogen atom from a ring atom. In this definition, the term "substituted heteroarenes" refers to compounds derived from monocyclic and polycyclic aromatic hydrocarbons in which (1) one or more of the hydrogen atoms of the hydrocarbon is replaced with a non-hydrogen atom (e.g., a halogen atom) or a non-alkyl functional group (e.g., a hydroxy group) and (2) at least one methine group (—C=)

of the hydrocarbon is replaced by a trivalent heteroatom and/or at least one vinylidene group (—CH=CH—) of the hydrocarbon is replaced by a divalent heteroatom.

As used herein, the term "alkanediyl groups" refers to divalent functional groups derived from alkanes by removal of two hydrogen atoms from the alkane. These hydrogen atoms can be removed from the same carbon atom on the alkane (as in ethane-1,1-diyl) or from different carbon atoms (as in ethane-1,2-diyl).

As used herein, the term "substituted alkanediyl groups" refers to divalent functional groups derived from substituted alkanes by removal of two hydrogen atoms from the alkane. These hydrogen atoms can be removed from the same carbon atom on the substituted alkane (as in 2-fluoroethane-1,1-diyl) or from different carbon atoms (as in 1-fluoroethane-1,2-diyl). In this definition, the term "substituted alkanes" has the same meaning as set forth above in the definition of substituted alkyl groups.

As used herein, the term "cycloalkanediyl groups" refers to divalent functional groups derived from cycloalkanes by removal of two hydrogen atoms from the cycloalkane. These hydrogen atoms can be removed from the same carbon atom on the cycloalkane or from different carbon atoms.

As used herein, the term "substituted cycloalkanediyl groups" refers to divalent functional groups derived from substituted cycloalkanes by removal of two hydrogen atoms from the alkane. In this definition, the term "substituted cycloalkanes" has the same meaning as set forth above in the definition of substituted cycloalkyl groups.

As used herein, the term "arenediyl groups" refers to divalent functional groups derived from arenes (monocyclic and polycyclic aromatic hydrocarbons) by removal of two hydrogen atoms from ring carbon atoms.

As used herein, the term "substituted arenediyl groups" refers to divalent functional groups derived from substituted arenes by removal of two hydrogen atoms from ring carbon atoms. In this definition, the term "substituted arenes" refers to compounds derived from monocyclic and polycyclic aromatic hydrocarbons in which one or more of the hydrogen atoms of the hydrocarbon is replaced with a non-hydrogen atom (e.g., a halogen atom) or a non-alkyl functional group (e.g., a hydroxy group).

As used herein, the term "heteroarenediyl groups" refers to divalent functional groups derived from heteroarenes by removal of two hydrogen atoms from ring atoms. In this definition, the term "heteroarenes" refers to compounds derived from monocyclic and polycyclic aromatic hydrocarbons in which at least one methine group (—C=) of the hydrocarbon is replaced by a trivalent heteroatom and/or at least one vinylidene group (—CH=CH—) of the hydrocarbon is replaced by a divalent heteroatom.

As used herein, the term "substituted heteroarenediyl groups" refers to divalent functional groups derived from substituted heteroarenes by removal of two hydrogen atoms from ring atoms. In this definition, the term "substituted heteroarenes" has the same meaning as set forth above in the definition of substituted heteroaryl groups.

Unless otherwise indicated, conditions are 25° C., 1 atmosphere of pressure and 50% relative humidity, concentrations are by weight, and molecular weight is based on weight average molecular weight. The term "polymer" as used in the present application denotes a material having a weight average molecular weight (Mw) of at least 5,000. The term "copolymer" is used in its broad sense to include polymers containing two or more different monomer units, such as terpolymers, and unless otherwise indicated, includes random, block, and statistical copolymers. The concentration of ethylene or propylene in a particular phase or in the heterophasic composition is based on the weight of reacted ethylene units or propylene units relative to the total weight of polyolefin polymer in the phase or heterophasic composition, respectively, excluding any fillers or other non-polyolefin additives. The concentration of each phase in the overall heterogeneous polymer composition is based on the total weight of polyolefin polymers in the heterophasic composition, excluding any fillers or other non-polyolefin additives or polymers.

The subject heterophasic polyolefin polymers that may be advantageously modified according to the present invention are characterized by at least two distinct phases—a propylene polymer phase comprising propylene polymers selected from polypropylene homopolymers and copolymers of propylene and up to 50 wt. % of ethylene and/or $C_4$-$C_{10}$ α-olefins and an ethylene polymer phase comprising ethylene polymers selected from ethylene homopolymers and copolymers of ethylene and $C_3$-$C_{10}$ α-olefins. The ethylene content of the ethylene polymer phase is at least 8 wt. %. When the ethylene phase is a copolymer of ethylene and $C_3$-$C_{10}$ α-olefins, the ethylene content of the ethylene phase may range from 8 to 90 wt. %. In one embodiment of the invention, the ethylene content of the ethylene phase is at least 50 wt. %. Either the propylene polymer phase or the ethylene polymer phase may form the continuous phase and the other will form the discrete or dispersed phase. For example, the ethylene polymer phase may be the discontinuous phase and the polypropylene polymer phase may be the continuous phase. In one embodiment of the invention, the propylene content of the propylene polymer phase is greater than the propylene content of the ethylene polymer phase.

The relative concentrations of the propylene polymer phase and the ethylene polymer phase may vary over a wide range. By way of example, the ethylene polymer phase may comprise from 5 to 80 wt. % of the total of propylene polymers and ethylene polymers in the composition and the propylene polymer phase may comprise from 20 to 95 wt. % of the total of propylene polymers and ethylene polymers in the composition.

In various embodiments of the invention, (i) the ethylene content may range from 5 to 75 wt. %, or even 5 to 60 wt. %, based on the total propylene polymer and ethylene polymer content in the heterophasic composition, (ii) the ethylene polymer phase may be an ethylene-propylene or ethylene-octene elastomer, and/or (iii) the propylene content of the propylene polymer phase may be 80 wt. % or greater.

The present invention is particularly useful to modify a polypropylene impact copolymer. The impact copolymer may be characterized by a continuous phase comprising polypropylene polymers selected from polypropylene homopolymers and copolymers of propylene and up to 50 wt. % of ethylene and/or $C_4$-$C_{10}$ α-olefins and a discontinuous phase comprising elastomeric ethylene polymers selected from ethylene/$C_3$-$C_{10}$ α-olefin monomers and the ethylene polymers have an ethylene content of from 8 to 90 wt. %.

In various embodiments of the invention directed to propylene impact copolymers, (i) the ethylene content of the discontinuous phase may be from 8 to 80 wt. %, (ii) the ethylene content of the heterophasic composition may be from 5 to 30 wt. %, based on the total propylene polymers and ethylene polymers in the composition; (iii) the propylene content of the continuous phase may be 80 wt. % or greater and/or (iv) the discontinuous phase may be from 5 to 35 wt. % of the total propylene polymers and ethylene polymers in the composition.

Examples of heterophasic polyolefin polymers that may be modified are impact copolymers characterized by a relatively rigid, polypropylene homopolymer matrix (continuous phase) and a finely dispersed phase of ethylene-propylene rubber (EPR) particles. Polypropylene impact copolymer may be made in a two-stage process, where the polypropylene homopolymer is polymerized first and the ethylene-propylene rubber is polymerized in a second stage. Alternatively, the impact copolymer may be made in a three or more stages, as is known in the art. Suitable processes may be found in the following references: U.S. Pat. Nos. 5,639,822 and 7,649,052 B2. Examples of suitable processes to make polypropylene impact copolymers are Spheripol®, Unipol®, Mitsui process, Novolen process, Spherizone®, Catalloy®, Chisso process, Innovene®, Borstar®, and Sinopec process. These processes could use heterogeneous or homogeneous Ziegler-Natta or metallocene catalysts to accomplish the polymerization.

The heterophasic polyolefin polymer composition may be formed by melt mixing two or more polymer compositions, which form at least two distinct phases in the solid state. By way of example, the heterophasic polyolefin composition may comprise three distinct phases. The heterophasic polyolefin polymer composition may result from melt mixing two or more types of recycled polyolefin compositions. Accordingly, the phrase "providing a heterophasic polyolefin polymer composition" as used herein includes employing a polyolefin polymer composition in the process that is already heterophasic, as well as melt mixing two or more polyolefin polymer compositions during the process, wherein the two or more polyolefin polymer compositions form a heterophasic system. For example, the heterophasic polyolefin polymer may be made by melt mixing a polypropylene homopolymer and an ethylene/α-olefin copolymer, such as an ethylene/butene elastomer. Examples of suitable copolymers would be Engage™ Exact®, Vistamaxx, Versify™, INFUSE™, Nordel™, Vistalon®, Exxelor™, and Affinity™. Furthermore, it can be understood that the miscibility of the polyolefin polymer components that form the heterophasic system may vary when the composition is heated above the melting point of the continuous phase in the system, yet the system will form two or more phases when it cools and solidifies. Examples of heterophasic polyolefin polymer compositions may be found in U.S. Pat. No. 8,207,272 B2 and EP 1 391 482 B1.

In one embodiment of the invention, the heterophasic polyolefin polymer to be modified does not have any polyolefin constituents with unsaturated bonds, in particular, both the propylene polymers in the propylene phase and the ethylene polymers in the ethylene phase are free of unsaturated bonds.

In another embodiment of the invention, in addition to the propylene polymer and ethylene polymer components, the heterophasic system may include an elastomer, such as elastomeric ethylene copolymers, elastomeric propylene copolymers, styrene block copolymers, such as styrene-butadiene-styrene (SBS), styrene-ethylene-butylene-styrene (SEBS), styrene-ethylene-propylene-styrene (SEPS) and styrene-isoprene-styrene (SIS), plastomers, ethylene-propylene-diene terpolymers, LLDPE, LDPE, VLDPE, polybutadiene, polyisoprene, natural rubber, and amorphous polyolefins. The rubbers may be virgin or recycled.

The heterophasic polyolefin polymer composition is modified by mixing the polymer composition with a compatibilizing agent in the presence of free radicals, which have been generated in the composition.

In one embodiment of the invention, the heterophasic polyolefin polymer composition is modified by melt mixing the polymer composition with a compatibilizing agent in the presence of free radicals, which have been generated in the composition. The melt mixing step is conducted under conditions such that the composition is heated to above the melting temperature of the major polyolefin component of the composition and mixed while in the molten state. Examples of suitable melt mixing processes include melt compounding, such as in an extruder, injection molding, and mixing in a Banbury mixer or kneader. By way of example, the mixture may be melt mixed at a temperature of from 160° C. to 300° C. In particular, propylene impact copolymers may be melt mixed at a temperature of from 180° C. to 290° C. The polymer composition (propylene polymer phase and ethylene polymer phase), compatibilizing agent and an organic peroxide may be melt compounded in an extruder, at a temperature above the melting temperature of all of the polyolefin polymers in the composition.

In another embodiment of the invention, the polymer may be dissolved in a solvent and the compatibilizing agent added to the polymer solution, and the radicals generated in solution. In another embodiment of the invention, the compatibilizing agent may be combined with the polymer in the solids state and free radicals could be generated during solid-state shear pulverization as described in Macromolecules, "Ester Functionalization of Polypropylene via Controlled Decomposition of Benzoyl Peroxide during Solid-State Shear Pulverization"—vol. 46, pp. 7834-7844 (2013).

Conventional processing equipment may be used to mix the propylene polymers, ethylene polymers and compatibilizing agent together in a single step, in the presence of free radicals that are either added to the mixture, such as an organic peroxide, or generated in situ, such as by shear, UV light, etc. Nevertheless, it is also possible to mix various combinations of the components in multiple steps and in various sequences, and subsequently subject the mixture to conditions whereby the compatibilizing agent reacts with the polyolefin polymers, as described herein.

For example, the compatibilizing agent and/or the free radical generator (when a chemical compound is used) can be added to the polymer in the form of one or masterbatch compositions. Suitable masterbatch compositions can comprise the compatibilizing agent and/or the free radical generator in a carrier resin. The compatibilizing agent and/or the free radical generator can be present in the masterbatch composition in an amount of about 1 wt. % to about 80 wt. % based on the total weight of the composition. Any suitable carrier resin can be used in the masterbatch compositions, such as any suitable thermoplastic polymer. For example, the carrier resin for the masterbatch compositions can be a polyolefin polymer, such as a polypropylene impact copolymer, a polyethylene homopolymer, a linear low density polyethylene polymer, a polyolefin wax, or mixtures of such polymers. The carrier resin can also be a propylene polymer or an ethylene polymer that is the same as or similar to the propylene polymer or ethylene polymer present in the heterophasic polyolefin polymer composition. Such a masterbatch composition would allow the end user to manipulate the ratio of propylene polymer(s) to ethylene polymer(s) present in the heterophasic polyolefin polymer composition. This may be preferred when the end user needs to modify the propylene to ethylene ratio of a commercial resin grade in order to achieve the desired set of properties (e.g., balance of impact and stiffness).

The compatibilizing agent is a compound comprising at least one moiety conforming to the structure of Formula (I)

(I)

In the structure of Formula (I), the bonds truncated by the wavy lines represent bonds to other portions of the compatibilizing agent molecule. Thus, suitable classes of compounds containing a moiety conforming to the structure of Formula (I) include, but are not limited to, trithiocarbonates, dithiocarbamates, dithiobenzoates, xanthates, metal dithiocarbamate complexes, and thiuram disulfides.

In a preferred embodiment, the compatibilizing agent is a compound conforming to the structure of Formula (X)

(X)

In the structure of Formula (X), $R_{10}$ is a group selected from the group consisting of aryl groups, substituted aryl groups, heterocyclyl groups, substituted heterocyclyl groups, heteroaryl groups, substituted heteroaryl groups, —S—$R_{51}$, —O—$R_{51}$, and —N($R_{51}$)($R_{52}$). $R_{51}$ and $R_{52}$ are independently selected from the group consisting of alkyl groups, substituted alkyl groups, aryl groups, substituted aryl groups, heteroaryl groups, and substituted heteroaryl groups. $R_{11}$, $R_{12}$, and $R_{13}$ are independently selected from the group consisting of hydrogen, cyano, alkyl groups, substituted alkyl groups, aryl groups, substituted aryl groups, —C(O)—O—$R_{61}$, and —$R_{65}$—C(O)—O—$R_{61}$. $R_{61}$ is selected from the group consisting of hydrogen, alkyl groups, substituted alkyl groups, heterocyclyl groups, substituted heterocyclyl groups, aryl groups, and substituted aryl groups. $R_{65}$ is selected from the group consisting of alkyl groups. In the structure of Formula (X), no more than two of $R_{11}$, $R_{12}$, and $R_{13}$ are hydrogen.

Examples of suitable compatibilizing agents conforming to the structure of Formula (X) include, but are not limited to:
3-butenyl 2-(dodecylthiocarbonothioylthio)-2-methylpropionate,
4-cyano-4-[(dodecylsulfanylthiocarbonyl)sulfanyl]pentanoic acid,
4-cyano-4-[(dodecylsulfanylthiocarbonyl)sulfanyl]pentanol,
cyanomethyl dodecyl trithiocarbonate,
cyanomethyl [3-(trimethoxysilyl)propyl]trithiocarbonate,
2-cyano-2-propyl dodecyl trithiocarbonate,
S,S-dibenzyl trithiocarbonate,
2-(dodecylthiocarbonothioylthio)-2-methylpropionic acid (also referred to as "DDMAT" and S-1-dodecyl-S'-(α,α'-dimethyl-α"-acetic acid)-trithiocarbonate),
2-(dodecylthiocarbonothioylthio)-2-methylpropionic acid 3-azido-1-propanol ester,
2-(dodecylthiocarbonothioylthio)-2-methylpropionic acid N-hydroxysuccinimide ester,
2-(dodecylthiocarbonothioylthio)-2-methylpropionic acid pentafluorophenyl ester,
2-(dodecylthiocarbonothioylthio)propionic acid,
methyl 2-(dodecylthiocarbonothioylthio)-2-methylpropionate,
pentaerythritol tetrakis[2-(dodecylthiocarbonothioylthio)-2-methylpropionate],
phthalimidomethyl butyl trithiocarbonate,
1,1,1-tris[(dodecylthiocarbonothioylthio)-2-methylpropionate]ethane,
benzyl 1H-pyrrole-1-carbodithioate,
cyanomethyl diphenylcarbamodithioate,
cyanomethyl methyl(phenyl)carbamodithioate,
cyanomethyl methyl(4-pyridyl)carbamodithioate,
2-cyanopropan-2-yl N-methyl-N-(pyridin-4-yl)carbamodithioate,
methyl 2-[methyl(4-pyridinyl)carbamothioylthio]propionate,
1-succinimidyl-4-cyano-44N-methyl-N-(4-pyridyl)carbamothioylthio]pentanoate,
benzyl benzodithioate,
cyanomethyl benzodithioate,
4-cyano-4-(phenylcarbonothioylthio)pentanoic acid,
4-cyano-4-(phenylcarbonothioylthio)pentanoic acid N-succinimidyl ester,
2-cyano-2-propyl benzodithioate,
2-cyano-2-propyl 4-cyanobenzodithioate,
ethyl 2-(4-methoxyphenylcarbonothioylthio)acetate,
ethyl 2-methyl-2-(phenylthiocarbonylthio)propionate,
ethyl 2-(phenylcarbonothioylthio)-2-phenylacetate,
ethyl 2-(phenylcarbonothioylthio)propionate,
1-(methoxycarbonyl)ethyl benzodithioate,
2-(4-methoxyphenylcarbonothioylthio)ethanoic acid,
2-nitro-5-(2-propynyloxy)benzyl 4-cyano-4-(phenylcarbonothioylthio)pentanoate,
2-(phenylcarbonothioylthio)propanoic acid,
2-phenyl-2-propyl benzodithioate,
cyanomethyl methyl(4-pyridyl)carbamodithioate,
2-cyanopropan-2-yl N-methyl-N-(pyridin-4-yl)carbamodithioate,
methyl 2-[methyl(4-pyridinyl)carbamothioylthio]propionate,
1-succinimidyl-4-cyano-4-[N-methyl-N-(4-pyridyl)carbamothioylthio]pentanoate,
S-1-octadecyl-S'-(α,α'-dimethyl-α"-acetic acid)-trithiocarbonate,
S-dodecyl-S'-(α,α'-dimethyl-α"-acetic acid butyl ester) trithiocarbonate
propyl dipropyldithiocarbamate,
allyl dipropyldithiocarbamate, and
benzyl dipropyldithiocarbamate.

The foregoing compounds can be used alone or in any suitable combination. In a preferred embodiment, the compatibilizing agent is a compound selected from the list provided above or a combination of such compounds.

As noted above, the compatibilizing agent can be a metal dithiocarbamate complex. Suitable metal dithiocarbamate complexes include, but are not limited to, those complexes conforming to the structure of Formula (XX) below (XX)

In the structure of Formula (XX), $R_{51}$ and $R_{52}$ are independently selected from the group consisting of alkyl groups, substituted alkyl groups, aryl groups, substituted aryl groups, heteroaryl groups, and substituted heteroaryl groups. M is a metal cation, and the variable x is equal to the charge of the metal cation. The variable y is a positive integer and represents the number of dithiocarbamate anions complexed with the metal cation. L is a ligand (i.e., a non-dithiocarbamate ligand) complexed with the metal cation, and the variable z is zero or a positive integer and represents the number of such ligands complexed with the metal cation. The values of x, y, and z satisfy the equation y+z=x. Preferably, $R_{51}$ and $R_{52}$ are selected from the group consisting of alkyl groups and aryl groups.

The compatibilizing can also be a thiruam disulfide. Suitable thiuram disulfides include, but are not limited to, those compounds conforming to the structure of Formula (XXX) below In the structure of Formula (XXX), $R_{51}$ and $R_{52}$ are independently selected from the group consisting of alkyl groups, substituted alkyl groups, aryl groups, substituted aryl groups, heteroaryl groups, and substituted heteroaryl groups. Preferably, $R_{51}$ and $R_{52}$ are selected from the group consisting of alkyl groups and aryl groups.

Suitable compatibilizing agents also include oligomeric and polymeric compounds comprising at least one moiety conforming to the structure of Formula (I). Suitable examples of such compounds include, but are not limited to:
DDMAT-terminated poly(acrylic acid),
poly(ethylene glycol) bis[2-(dodecylthiocarbonothioyl-thio)-2-methylpropionate],
poly(ethylene glycol) methyl ether 4-cyano-4-[(dodecylsulfanylthiocarbonyl)sulfanyl]pentanoate,
poly(ethylene glycol) methyl ether (4-cyano-4-pentanoate dodecyl trithiocarbonate),
poly(ethylene glycol) methyl ether 2-(dodecylthiocarbonothioylthio)-2-methylpropionate,
poly(ethylene glycol) methyl ether (2-methyl-2-propionic acid dodecyl trithiocarbonate),
poly(L-lactide) 4-cyano-4-[(dodecylsulfanylthiocarbonyl)sulfanyl]pentonate,
DDMAT-terminated polystyrene,
DDMAT-terminated poly(tert-butyl-acrylate),
DDMAT-terminated poly(N,N-dimethylacrylamide),
poly(ethylene glycol) 4-cyano-4-(phenylcarbonothioylthio)pentanoate, and
DDMAT-terminated poly(hydroxyethyl methacrylate).
The oligmeric and polymeric compounds described above can have any suitable molecular weight (e.g., number average molecular weight). Generally, the number average molecular weight of the compounds is from about 1,000 to about 10,000. These oligomeric and polymeric compounds can be used alone or in any suitable combination.

Non-oligomeric and non-polymeric compatibilizing agents (such as those listed above) are generally preferred over oligomeric and polymeric compatibilizing agents (such as those listed above). This preference is generally attributable to the fact that a relatively large mass of an oligomeric or polymeric compatibilizing agent must be used in order to provide a given molar equivalent of moieties conforming to the structure of Formula (I). For example, in order to provide one molar equivalent of moieties conforming to the structure of Formula (I), one would need to use about 5,000 grams of a DDMAT-terminated polystyrene having a number average molecular weight of 5,000. By way of contrast, one would only need to use about 244 grams of benzyl benzodithioate to provide the same amount of moieties conforming to the structure of Formula (I). This lower mass of compatibilizing agent will generally be easier to handle and easier to process. While there is a general preference for non-oligomeric and non-polymeric compatibilizing agent, there may be instances in which the oligomeric and/or polymeric compounds are more compatible with the resin system, and this increased compatibility may be sufficient to compensate for the complications posed by the handling and processing of the increased mass of compatibilizing agent that must be used.

The concentration of the compatibilizing agent in the composition can be varied to meet the objectives of the end user. For example, the concentration can be varied in order to achieve a desired increase in the MFR of the polymer composition with a minimal decrease (or potentially even an increase) in the strength of the polymer, in particular the impact strength. In a preferred embodiment, the compatibilizing agent can be present in an amount of about 10 ppm or more, about 50 ppm or more, about 100 ppm or more, about 150 ppm or more, or about 200 ppm or more, based on the total weight of the polymer composition. In another preferred embodiment, the compatibilizing agent can be present in an amount of about 5 wt. % (50,000 ppm) or less, about 4 wt. % (40,000 ppm) or less, about 3 wt. % (30,000 ppm) or less, about 2 wt. % (20,000 ppm) or less, about 1 wt. % (10,000 ppm) or less, or about 0.5 wt. % (5,000 ppm) or less, based on the total weight of the polymer composition. Thus, in certain preferred embodiments, the compatibilizing agent can be present in an amount of about 10 to about 50,000 ppm, about 100 to about 10,000 ppm, or about 200 to about 5,000 ppm, based on the total weight of the polymer composition.

When a chemical free radical generator is employed (as discussed below), the concentration of the compatibilizing agent in the polymer composition can additionally or alternatively be expressed in terms of a ratio between the amount of the compatibilizing agent and the amount of the chemical free radical generator. In order to normalize this ratio for differences in the molecular weight of compatibilizing agents and number of peroxide bonds in the chemical free radical generators, the ratio is usual expressed as a ratio of the number of moles of compatibilizing agent present in the composition to the molar equivalents of peroxide bonds (O—O bonds) present from the addition of the chemical free radical generator. Preferably, the ratio (i.e., ratio of moles of compatibilizing agent to molar equivalents of peroxide bonds) is about 1:10 or more, about 1:5 or more, about 3:10 or more, about 2:5 or more, about 1:2 or more, about 3:5 or more, about 7:10 or more, about 4:5 or more, about 9:10 or more, or about 1:1 or more. In another preferred embodiment, the ratio is about 10:1 or less, about 5:1 or less, about 10:3 or less, about 5:2 or less, about 2:1 or less, about 5:3 or less, about 10:7 or less, about 5:4 or less, about 10:9 or less, or about 1:1 or less. Thus, in a series of preferred embodiments, the compatibilizing agent can be present in the composition in a ratio of moles of compatibilizing agent to molar equivalents of peroxide bonds of about 1:10 to about 10:1, about 1:5 to about 5:1, about 1:4 to about 4:1, about 3:10 to about 10:3, about 2:5 to about 5:2, or about 1:2 to about 2:1.

A free radical generator is employed in the present invention to cause polymer chain scission and thereby positively affect the MFR of the heterophasic polyolefin polymer composition, while generating sufficient free radicals to foster the reaction of the compatibilizing agent with the polyolefin polymers in the composition. The free radical generator may be a chemical compound, such as an organic peroxide or a bis-azo compound, or free radicals may be generated by applying ultrasound, shear, an electron beam (for example n-rays), light (for example UV light), heat and radiation (for example y-rays and X-rays), to the reaction system, or combinations of the foregoing.

Organic peroxides having one or more O—O functionalities are of particular utility in the present invention. Examples of such organic peroxides include: 2,5-dimethyl-2,5-di(tert-butylperoxy)hexane, 2,5-dimethyl-2,5-di(tert-butyl peroxy)hexyne-3,3,6,6,9,9-pentamethyl-3-(ethyl acetate)-1,2,4,5-tetraoxy cyclononane, tert-butyl hydroperoxide, hydrogen peroxide, dicumyl peroxide, tert-butyl peroxy isopropyl carbonate, di-tert-butyl peroxide, p-chlorobenzoyl peroxide, dibenzoyl diperoxide, tert-butyl cumyl peroxide; tert-butyl hydroxyethyl peroxide, di-tert-amyl peroxide and 2,5-dimethylhexene-2,5-diperisononanoate, acetylcyclohexanesulphonyl peroxide, diisopropyl peroxydicarbonate, tert-amyl perneodecanoate, tert-butyl-perneodecanoate, tert-butylperpivalate, tert-amylperpivalate, bis(2,4-dichlorobenzoyl)peroxide, diisononanoyl peroxide, didecanoyl peroxide, dioctanoyl peroxide, dilauroyl peroxide, bis(2-methylbenzoyl)peroxide, disuccinoyl peroxide, diacetyl peroxide, dibenzoyl peroxide, tert-butyl per-2-ethylhexanoate, bis(4-chlorobenzoyl) peroxide, tert-butyl perisobutyrate, tert-butyl permaleate, 1,1-bis(tert-butylperoxy)-3,5,5-trimethylcyclo-hexane, 1,1-bis(tert-butylperoxy)cyclohexane, tert-butyl peroxyisopropyl carbonate, tert-butyl perisononaoate, 2,5-dimethylhexane 2,5-dibenzoate, tert-butyl peracetate, tert-amyl perbenzoate, tert-butyl perbenzoate, 2,2-bis(tert-butylperoxy)butane, 2,2-bis(tert-butylperoxy)propane, dicumyl peroxide, 2,5-dimethylhexane 2,5-di-tert-butylperoxide, 3-tert-butylperoxy-3-phenyl phthalide, di-tert-amyl peroxide, α,α'-bis(tert-butylperoxyisopropyl)benzene, 3,5-bis(tert-butylperoxy)-3,5-dimethyl-1,2-dioxolane, di-tert-butyl peroxide, 2,5-dimethylhexyne 2,5-di-tert-butyl peroxide, 3,3,6,6,9,9-hexamethyl-1,2,4,5-tetraoxacyclononane, p-menthane hydroperoxide, pinane hydroperoxide, diisopropylbenzene mono-α-hydroperoxide, cumene hydroperoxide or tert-butyl hydroperoxide.

The organic peroxide can be present in the polymer composition in any suitable amount. The suitable amount of organic peroxide will depend upon several factors, such as the particular polymer that is used in the composition, the starting MFR of the polymer, and the desired change in the MFR of the polymer. In a preferred embodiment, the organic peroxide can be present in the polymer composition in an amount of about 10 ppm or more, about 50 ppm or more, or about 100 ppm or more, based on the total weight of the polymer composition. In another preferred embodiment, the organic peroxide can be present in the polymer composition in an amount of about 2 wt. % (20,000 ppm) or less, about 1 wt. % (10,000 ppm) or less, about 0.5 wt. % (5,000 ppm) or less, about 0.4 wt. % (4,000 ppm) or less, about 0.3 wt. % (3,000 ppm) or less, about 0.2 wt. % (2,000 ppm) or less, or about 0.1 wt. % (1,000 ppm) or less, based on the total weight of the polymer composition. Thus, in a series of preferred embodiments, the organic peroxide can be present in the polymer composition in an amount of about 10 to about 20,000 ppm, about 50 to about 5,000 ppm, about 100 to about 2,000 ppm, or about 100 to about 1,000 ppm, based on the total weight of the polymer composition. The amount of organic peroxide can also be expressed in terms of a molar ratio of the compatibilizing agent and peroxide bonds, as is described above.

Suitable bis azo compounds may also be employed as a source of free radicals. Such azo compounds are for example 2,2'-azobisisobutyronitrile, 2,2'-azobis(2-methylbutyronitrile), 2,2'-azobis(2,4-dimethylvaleronitrile), 2,2'-azobis(4-methoxy-2,4-dimethylvaleronitrile), 1,1'-azobis(1-cyclohexanecarbonitrile), 2,2'-azobis(isobutyramide)dihydrate, 2-phenylazo-2,4-dimethyl-4-methoxyvaleronitrile, dimethyl 2,2'-azobisisobutyrate, 2-(carbamoylazo)isobutyronitrile, 2,2'-azobis(2,4,4-trimethylpentane), 2,2'-azobis(2-methylpropane), 2,2'-azobis(N,N'-dimethyleneisobutyramidine) as free base or hydrochloride, 2,2'-azobis(2-amidinopropane) as free base or hydrochloride, 2,2'-azobis{2-methyl-N-[1,1-bis(hydroxymethyl)ethyl]propionamide} or 2,2'-azobis{2-methyl-N-[1,1-bis(hydroxymethyl)-2-hydroxyethyl]propionamide}.

Other chemical compounds useful as free radical initiators include 2,3-dimethyl-2,3-diphenylbutane and sterically hindered hydroxylamine ester.

The various radical generators may be employed alone or in combination.

The heterophasic polyolefin composition of the present invention is compatible with various types of additives conventionally used in thermoplastic compositions, including stabilizers, UV absorbers, hindered-amine light stabilizers (HALS), antioxidants, flame retardants, acid neutralizers, slip agents, antiblocking agents, antistatic agents, antiscratch agents, processing aids, blowing agents, colorants, opacifiers, clarifiers, and/or nucleating agents. By way of further example, the composition may comprise fillers, such as calcium carbonate, talc, glass fibers, glass spheres, inorganic whiskers such as Hyperform® HPR-803i available from Milliken Chemical, USA, magnesium oxysulfate whiskers, calcium sulfate whiskers, calcium carbonate whiskers, mica, wollastonite, clays, such as montmorillonite, and bio-sourced or natural filler. The additives may comprise up to 75 wt. % of the total components in the modified heterophasic polyolefin composition.

The heterophasic polyolefin composition of the present invention may be used in conventional polymer processing applications, including but not limited to injection molding, thin-wall injection molding, single-screw compounding, twin-screw compounding, Banbury mixing, co-kneader mixing, two-roll milling, sheet extrusion, fiber extrusion, film extrusion, pipe extrusion, profile extrusion, extrusion coating, extrusion blow molding, injection blow molding, injection stretch blow molding, compression molding, extrusion compression molding, compression blow forming, compression stretch blow forming, thermoforming, and rotomolding. Thermoplastic polymer articles made using the thermoplastic polymer composition of the invention can be comprised of multiple layers, with one or any suitable number of the multiple layers containing a thermoplastic polymer composition of the invention. By way of example, typical end-use products include containers, packaging, automotive parts, bottles, expanded or foamed articles, appliance parts, closures, cups, furniture, housewares, battery cases, crates, pallets, films, sheet, fibers, pipe, and rotationally molded parts.

The following examples further illustrate the subject matter described above but, of course, should not be construed as in any way limiting the scope thereof. The following methods, unless noted, were used to determine the properties described in the following examples.

Each of the compositions was compounded by blending the components in a closed container for approximately one minute. The compositions were then melt compounded on a Prism TSE-16-TC co-rotating, fully intermeshing, parallel, twin-screw extruder with a 16 mm screw diameter and a length/diameter ratio of 25:1. The barrel temperature of the extruder was ramped from approximately 195° C. to approximately 215° C., and the screw speed was set at approximately 500 rpm. The extrudate (in the form of a strand) for each polypropylene copolymer composition was cooled in a water bath and subsequently pelletized.

The pelletized compositions were then used to form bars by injection molding the compositions on a Nissei HM7 7 ton injection molder having a 14 mm diameter screw. The barrel temperature of the injection molder was approximately 215 to 230° C., and the mold temperature was approximately 25° C. The resulting bars measured approximately 80 mm long, approximately 10 mm wide, and approximately 4.0 mm thick.

The melt flow rate (MFR) was determined on the pelletized compositions according to (ASTM D1238) at 230° C. with a load of 2.16 kg for polypropylene.

The notched Izod impact strength for the bars was measured according to ISO method 180/A. The notched Izod impact strength was measured at +23° C. on bars that had been conditioned at either +23° C. or −30° C. The molecular weight distribution (MWD) as well as the weight average of said distribution, $M_w$, was determined using gel permeation chromatography (GPC), also referred to as size exclusion chromatography (SEC). All measurements were conducted by the use of the Agilent PL-GPC 220 GPC/SEC system containing PLgel Olexis Guard column and (3) 300×7.5 mm PLgel Olexis PL1110-6400 columns, a Refractive Index detector, Viscometer and 15° and 90° Light Scattering detector (at 160° C.) with trichlorobenzene inhibited with 125 ppm butylhydroxytoluene as mobile phase, a column temperature of 160° C. and a sample concentration of approximately 1 mg/ml. In the examples listed below, a 15° light scattering detector was chosen to measure concentration. Gel permeation chromatography is a separation technique in which molecules are separated on the basis of hydrodynamic molecular volume or size. With proper column calibration or by the use of molecular-weight-sensitive detectors, such as light scattering or viscometry the molecular weight distribution and the statistical molecular weight averages can be obtained. In gel permeation chromatography, molecules pass through a column via a combination of transport into and through beads along with between beads in the column. The time required for passage of a molecule through the column is decreased with increasing molecular weight. The amount of polymer exiting the column at any given time is measured with various detectors. A more in depth description of the instrumentation and detectors can be found in the chapter titled "Composition, Molar Mass and Molar Mass Distribution" in *Characterization and Analysis of Polymers* by Ron Clavier (2008).

Xylene solubles were determined by a modified ASTM D5492-10 and are a measure of the amount of rubber present in the heterophasic polypropylene copolymers. Approximately 0.6 g of polymer was weighed out and placed into a round-bottom flask along with a stir bar. 50 mL of xylene was added to the polymer in the flask. The polymer xylene mixture was heated to reflux temperature while vigorously stirring. Once the reflux temperature was reached, the solution was stirred for an additional 30 min then cooled to room temperature. The resulting polymer/xylene mixture was gently stirred to break up any precipitated polymer gel then poured through a No. 4 filter paper, both the filtrate containing the soluble fraction and the insoluble fraction were collected. A 10 mL aliquot of the filtrate was taken with a Class A pipet and transferred into a weighed pan. The pan containing the filtrate was then placed on a temperature-controlled hot plate maintaining a temperature of 155° C. to evaporate the xylene. Once most of the xylene was evaporated, the pan was transferred to a vacuum oven set at a temperature of 80±10° C. The pressure was reduced to less than 13.3 kPa and the sample was dried for approximately 2 hours or until a constant weight was achieved. The pan mass was then subtracted giving the mass of the residual soluble polymer. The percentage of soluble polymer in the original sample was calculated as follows:

$$S_s = ((V_{b0}/V_{b1})*(W_2 - W_1))/W_0)*100$$

where $S_s$=soluble fraction of sample, %; $V_{b0}$=original volume of solvent, mL; $V_{b1}$=volume of aliquot used for soluble determination, mL; $W_2$=mass of pan and soluble, g; $W_1$=mass of pan, g; and $W_0$=mass of original sample, g.

EXAMPLES 1-6

The following examples demonstrate the modification of a heterophasic polyolefin composition and performance enhancements achieved, according to the method of the present invention.

The compatibilizing agent (CA) was melt compounded into batches of a heterophasic polypropylene copolymer in accordance with the general formulation set forth in Table 1.

TABLE 1

Heterophasic polypropylene copolymer formulations.

| Component | Loading |
|---|---|
| Polypropylene copolymer (LyondellBasell Pro-Fax SD375S with approximately 19% xylene solubles) | Balance |
| Primary antioxidant (Irganox ® 1010) | 500 ppm |
| Secondary antioxidant (Irgafos ® 168) | 1000 ppm |
| Acid scavenger (calcium stearate) | 800 ppm |
| Peroxide (Varox DBPH) | See Table 2 |
| Compatibilizing Agent (CA) S-1-octadecyl-S'-(α,α'-dimethyl-α"-acetic acid)-trithiocarbonate | See Table 2 |

Irganox ® 1010 is available from BASF
Irgafos ® 168 is available from BASF
Varox DBPH is an organic peroxide available from R.T. Vanderbilt Company Each of the compositions listed in Table 2 was mixed, extruded, and injection molded according to the procedure described above. The bars were then subjected to melt flow rate and Izod impact testing as described above, and evaluated using the 15° light scattering detector signal during testing by Gel Permeation Chromatography (GPC).

TABLE 2

Performance in medium-impact, heterophasic polypropylene copolymer.

| Sample | Peroxide Loading (ppm) | CA Loading (Molar ratio CA:Peroxide) | CA Loading (ppm) | MFR (g/10 min) | Izod impact at 23° C. (J/m) |
|---|---|---|---|---|---|
| Unmodified Resin | — | — | — | 19 | 95 |
| Peroxide Only | 500 | — | — | 60 | 58 |
| Ex. 1 | 500 | 1:5 | 285 | 65 | 65 |
| Ex. 2 | 500 | 1:2 | 711 | 68 | 74 |
| Ex. 3 | 500 | 1:1 | 1423 | 52 | 88 |
| Peroxide Only | 1000 | — | — | 102 | 46 |
| Ex. 4 | 1000 | 1:5 | 569 | 103 | 60 |
| Ex. 5 | 1000 | 1:2 | 1423 | 88 | 67 |
| Ex. 6 | 1000 | 1:1 | 2846 | 66 | 86 |

Figure 1:
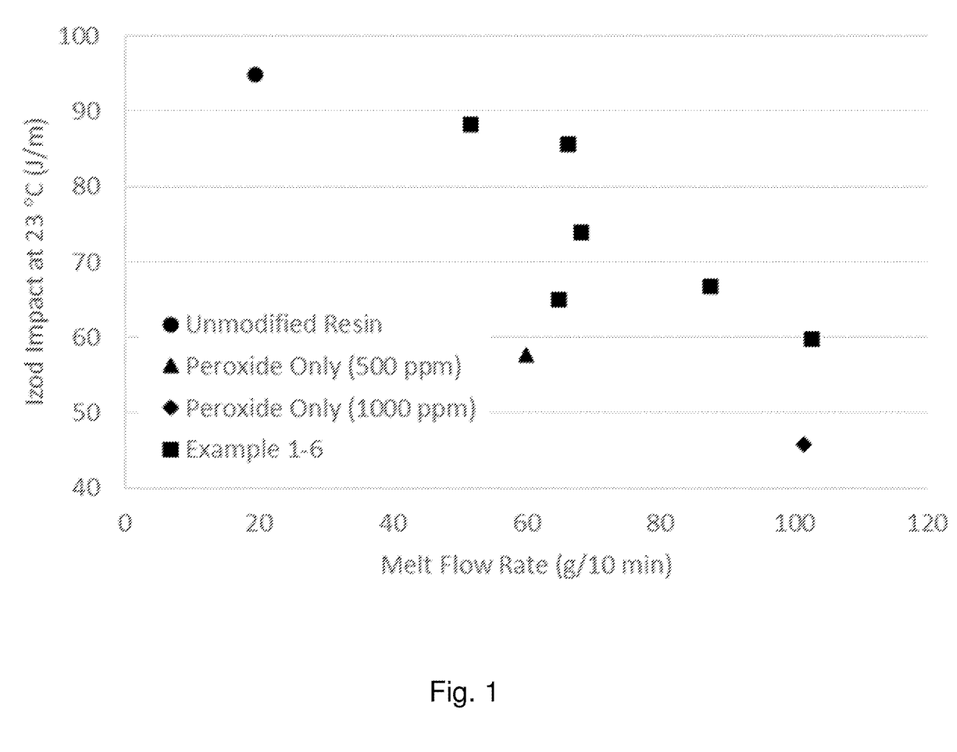
FIG. 1 is a plot of Melt Flow Rate versus Izod Impact strength for the unmodified resin, vis-broken resin (with 500 ppm and 1,000 ppm of peroxide), and Examples 1-6 from the first set of examples.

Referring to FIG. 1, the Izod Impact Strength (23° C.) vs. MFR data from Table 2 for the unmodified resin, the resin with 500 and 1000 ppm of the organic peroxide only and six loading levels of the compatibilizing agent (Examples 1-6) are presented. From the chart it is evident that the samples containing the compatibilizing agent have improved impact strength and MFR compared to the vis-broken (organic peroxide only) samples.

Figure 2:
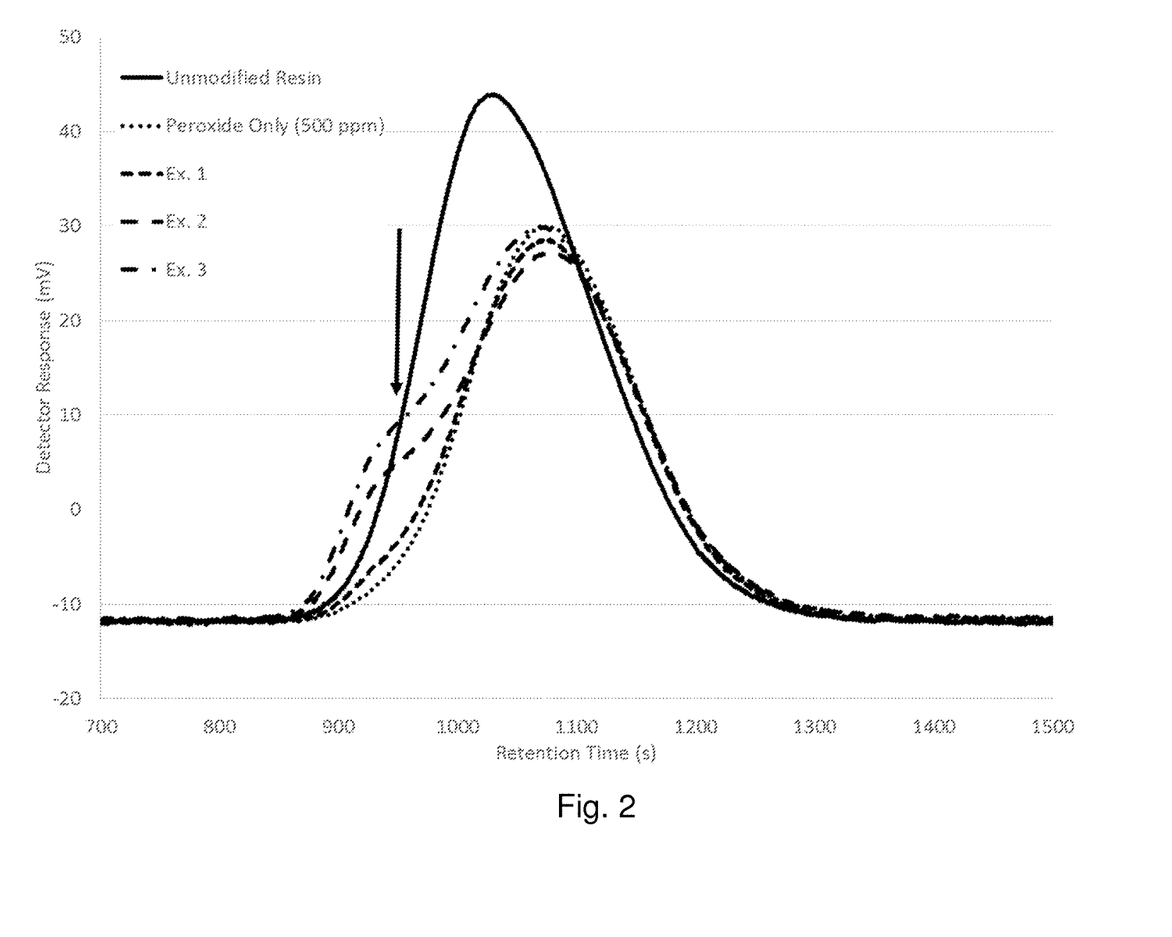
FIG. 2 shows GPC curves for the unmodified resin, vis-broken resin, and Examples 1-3 from the first set of examples.

The resulting change in polymer molecular weight is shown in FIG. 2, based on GPC data for the unmodified resin, resin mixed with 500 ppm of organic peroxide only and Examples 1, 2 and 3. When peroxide is added to polypropylene, the molecular weight is decreased as indicated by the peak shift to longer retention times and there is a relative decrease in signal at retention times less than about 900 seconds. The inventive compositions (Examples 1-3) show a similar main peak position as the peroxide-only sample at shorter retention times (higher molecular weights) and a pronounced shoulder at a retention times less than 1000 seconds not observed in the unmodified or peroxide-only modified heterophasic resin. This shoulder indicates the formation of a modified polymer with molecular weight higher than that of either the unmodified or peroxide-only modified heterophasic resin.

COMPARATIVE EXAMPLES C1-C3

The following examples demonstrate the combination of a compatibilizing agent (CA) according to the present invention S-1-octadecyl-S'-($\alpha,\alpha$'-dimethyl-$\alpha$"-acetic acid)-trithiocarbonate, with a polypropylene homopolymer composition, which is a single phase (i.e., non-heterophasic) polyolefin composition.

The comparative compounds were compounded into batches of polypropylene homopolymer compositions in accordance with the general formulation set forth in Table 3.

TABLE 3

Polypropylene homopolymer formulations.

| Component | Loading |
|---|---|
| Polypropylene homopolymer (LyondellBasell Pro-Fax HP6301) | Balance |
| Primary antioxidant (Irganox ® 1010) | 500 ppm |
| Secondary antioxidant (Irgafos ® 168) | 1000 ppm |
| Acid scavenger (calcium stearate) | 800 ppm |

TABLE 3-continued

Polypropylene homopolymer formulations.

| Component | Loading |
|---|---|
| Peroxide (Varox DBPH) | 500 ppm |
| Compatibilizing Agent (CA) S-1-octadecyl-S'-($\alpha,\alpha$'-dimethyl-$\alpha$"-acetic acid)-trithiocarbonate | See Table 4 |

Irganox ® 1010 is available from BASF
Irgafos ® 168 is available from BASF
Varox DBPH is available from R.T. Vanderbilt Company Each of the polypropylene homopolymer compositions shown in Table 4 was mixed, extruded, and pelletized according to the procedure described above. The pellets were then subjected to melt flow rate measurement and evaluated using the 15° light scattering detector signal during testing by Gel Permeation Chromatography (GPC).

TABLE 4

Performance in homopolymer polypropylene copolymer.

| Sample | CA Loading (Molar ratio CA:Peroxide) | CA Loading (ppm) | MFR (g/10 min) |
|---|---|---|---|
| Unmodified Resin | — | — | 16 |
| 500 ppm Peroxide Only | — | — | 60 |
| Comp. C1 | 1:5 | 285 | 71 |
| Comp. C2 | 1:2 | 711 | 69 |
| Comp. C3 | 1:1 | 1423 | 65 |

Figure 3:
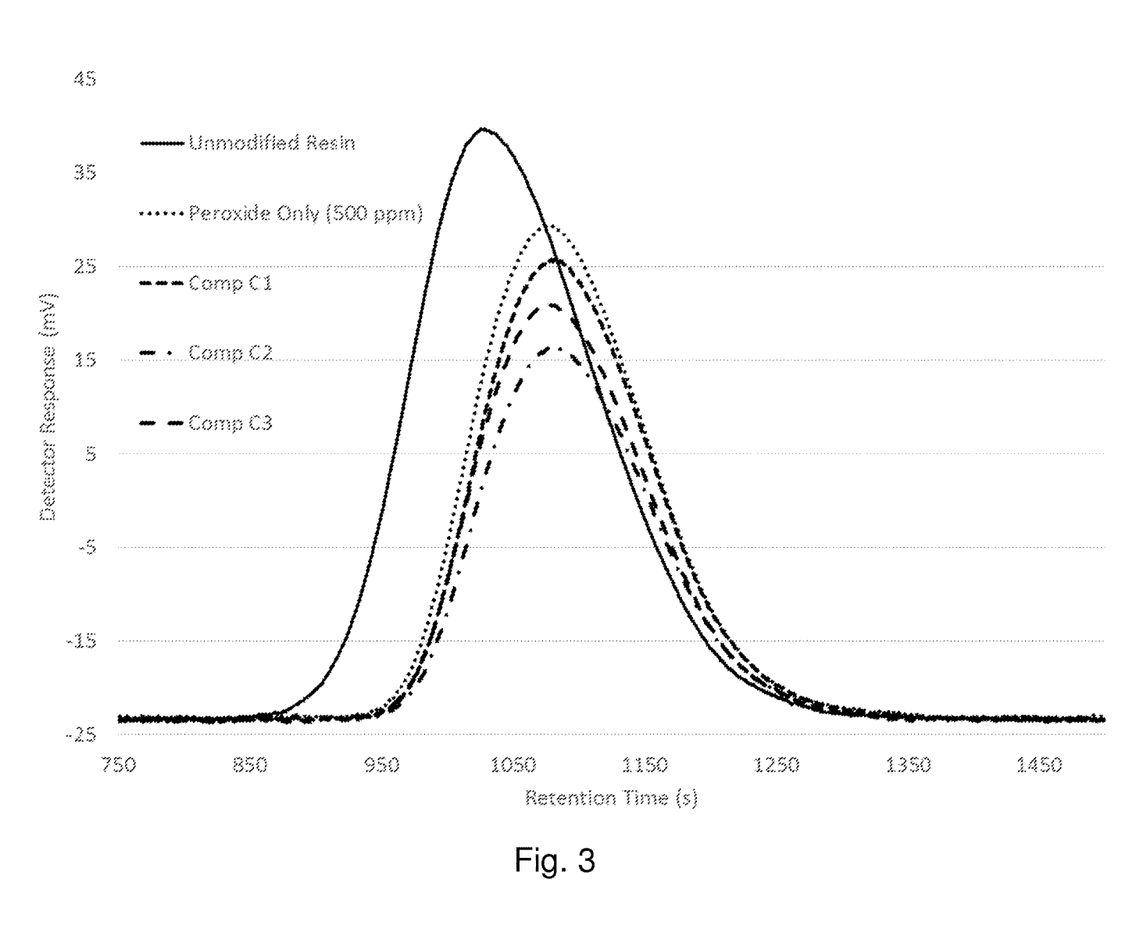
FIG. 3 shows GPC curves for the unmodified resin, vis-broken resin, and Examples C1-C3 from the second set of examples.

The resulting change in polymer molecular weight is shown in FIG. 3 for Comparative Examples C1-C3, along with the unmodified non-heterophasic polypropylene homopolymer resin and the resin with 500 ppm organic peroxide only. When peroxide is added to polypropylene homopolymer, the molecular weight is decreased as indicated by the shift to longer retention times. The comparative compositions containing S-1-octadecyl-S'-($\alpha,\alpha$'-dimethyl-$\alpha$"-acetic acid)-trithiocarbonate do not show a significant shift in peak retention time nor the shoulder as seen with Examples 1 and 2, where a heterophasic polymer composition was used. This is believed to demonstrate how the use of a heterophasic polymer system leads to the formation of a unique polymer by the bonding of the two different phases.

EXAMPLES 7-16

The following examples demonstrate the production of several heterophasic polyolefin compositions as described above and investigates the performance enhancements achieved through the incorporation of the compatibilizing agents as described above.

Several compatibilizing agents (CA) according to the invention and comparative compounds were each melt mixed into different batches of heterophasic polypropylene copolymer compositions, in accordance with the general formulation set forth in Table 5. Table 6 sets forth the structure of the compatibilizing agent compound used in each composition.

TABLE 5

Polypropylene copolymer formulations

| Component | Loading |
|---|---|
| Polypropylene copolymer (LyondellBasell Pro-Fax SD375S with approximately 19% xylene solubles) | Balance |
| Primary antioxidant (Irganox ® 1010) | 500 ppm |
| Secondary antioxidant (Irgafos ® 168) | 1000 ppm |
| Acid scavenger (calcium stearate) | 800 ppm |
| Peroxide (Varox DBPH) | See Table 7 |
| Additive | See Table 7 |

Irganox ® 1010 is available from BASF
Irgafos ® 168 is available from BASF
Varox DBPH is available from R.T. Vanderbilt Company

TABLE 6

Compatibilizing agent (CA) names, structures and general chemistry family.

| Sample | Chemical Name and Structure | Family |
|---|---|---|
| Ex. 7 & 8 | 1,1,1-Tris[(dodecylthiocarbonothioylthio)-2-methylpropionate]ethane | Trithiocarbonate |
| Ex. 9 & 10 | 2-(Dodecylthiocarbonothioylthio)-2-methylpropionic acid | Trithiocarbonate |
| Ex. 11 & 12 | Benzyl 1H-pyrrole-1-carbodithioate | Dithiocarbamate |
| Ex. 13 & 14 | 1-(Methoxycarbonyl)ethyl benzodithioate | Dithiobenzoate |
| Ex. 15 & 16 | S-1-dodecyl-S'-($\alpha,\alpha'$-dimethyl-$\alpha''$-acetic acid)-trithiocarbonate | Trithiocarbonate |

TABLE 6-continued

Compatibilizing agent (CA) names, structures and general chemistry family.

| Sample | Chemical Name and Structure | Family |
|---|---|---|
| Ex. 17 & 18 | Methyl (tert-Butoxycarbonothioyl)sulfanyl acetate | Xanthate |

Each of the heterophasic polypropylene copolymer compositions was mixed, extruded, and injection molded according to the procedure described above. The bars were then subjected to melt flow rate measurement and Izod impact testing as described above. The data for the inventive examples (Examples 7-18) and comparative examples are set forth in Table 7.

TABLE 7

Inventive and comparative performance

| Sample | CA Loading (Molar ratio CA:Peroxide) | CA Loading (ppm) | Change in Melt Flow Rate from Unmodified Resin (%) | Change in Izod impact at 23° C. from Unmodified Resin (%) | Change in Izod impact at −30° C. from Unmodified Resin (%) |
|---|---|---|---|---|---|
| Unmodified Resin | — | — | 0 | 0 | 0 |
| 500 ppm Peroxide Only | — | — | 192 | −43 | −24 |
| Ex. 7 | 1:1.33 | 1501 | 145 | −9 | −7 |
| Ex. 8 | 1:1.75 | 1140 | 188 | −13 | −2 |
| Ex. 9 | 1:1 | 628 | 306 | −35 | −13 |
| Ex. 10 | 1:0.5 | 1255 | 219 | −24 | 2 |
| Ex. 11 | 1:1 | 402 | 93 | −11 | 6 |
| Ex. 12 | 1:0.5 | 803 | 51 | −5 | 1 |
| Ex. 13 | 1:1 | 414 | 166 | −21 | −1 |
| Ex. 14 | 1:0.5 | 828 | 117 | −12 | 5 |
| Ex. 15 | 1:2 | 567 | 219 | −24 | 24 |
| Ex. 16 | 1:1 | 1133 | 182 | −10 | 11 |
| Ex. 17 | 1:2 | 382 | 212 | −31 | −13 |
| Ex. 18 | 1:1 | 764 | 206 | −15 | −8 |

Figure 4:
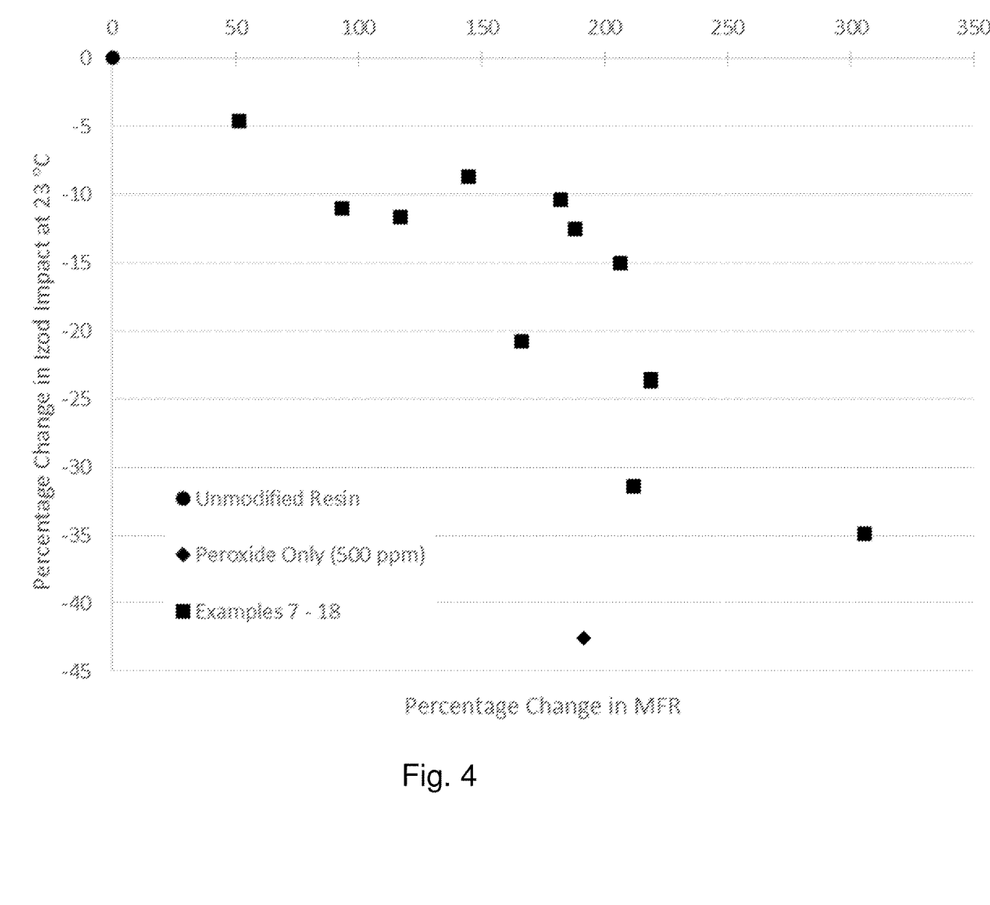
FIG. 4 is a plot showing the percent change in Melt Flow Rate versus the percent change in Izod Impact strength for the unmodified resin, vis-broken resin (with 500 ppm of peroxide), and Examples 7-18 from the third set of examples.

From the data set forth in FIG. 4 and Table 7, it is apparent that the inventive compositions (Examples 7-18) exhibit an increased melt flow as compared to the unmodified resin and yet do not show as dramatic a decrease in impact strength as would be expected from the addition of the peroxide (compare impact strength for the 500 ppm peroxide sample).

EXAMPLES 18-23

The following examples demonstrate the production of compositions and performance enhancements achieved through the incorporation of 5-1-octadecyl-S'-(α,α'-dimethyl-α"-acetic acid)-trithiocarbonate into a high-impact heterophasic polypropylene copolymer according to the invention. The resin used for these samples was an 18 MFR high-impact, heterophasic polypropylene copolymer, Pro-Fax SG702 (LyondellBasell Industries) which had approximately 25% xylene solubles. The compositions consisted of the ingredients listed in Table 8.

TABLE 8

High-impact heterophasic polypropylene copolymer

| Component | Amount |
|---|---|
| LyondellBasell Pro-Fax SG702 | Balance |
| Primary antioxidant (Irganox ® 1010) | 500 ppm |

TABLE 8-continued

High-impact heterophasic polypropylene copolymer

| Component | Amount |
|---|---|
| Secondary antioxidant (Irgafos ® 168) | 1000 ppm |
| Calcium stearate | 400 ppm |
| Varox DBPH | See Table 10 |
| Compatibilizing Agent (CA) S-1-octadecyl-S'-(α,α'-dimethyl-α"-acetic acid)-trithiocarbonate | See Table 10 |

Irganox ® 1010 is available from BASF
Irgafos ® 168 is available from BASF
Varox DBPH is available from R.T. Vanderbilt Company Each of the compositions listed in Table 8 was mixed, extruded, and injection molded according to the procedure described above. The bars were then subjected to melt flow rate measurement and Izod impact testing as described above.

TABLE 9

Performance in high-impact, heterophasic polypropylene copolymer.

| Example | Additive Loading (Molar ratio CA:Peroxide) | Additive Loading (ppm) | Melt Flow Rate (g/10 min) | Izod impact at 23° C. (J/m) | Izod impact at −30° C. (J/m) |
|---|---|---|---|---|---|
| Unmodified Resin | — | — | 17 | Non-Break | 44 |
| 500 ppm Peroxide Only | — | — | 58 | 84 | 40 |
| Ex. 18 | 1:10 | 276 | 54 | 94 | 60 |
| Ex. 19 | 1:2 | 414 | 52 | 143 | 61 |
| Ex. 20 | 1:1 | 827 | 41 | Partial and Non-breaks | 55 |
| 1,000 ppm Peroxide Only | — | — | 94 | 61 | 40 |
| Ex. 21 | 1:10 | 552 | 99 | 66 | 37 |
| Ex. 22 | 1:2 | 827 | 72 | 110 | 47 |
| Ex. 23 | 1:1 | 1655 | 43 | Non-Break | 70 |

The compositions resulting from the addition of 500 and 1,000 ppm organic peroxide only (no compatibilizing agent) demonstrate that as the peroxide is added to the high-impact polypropylene copolymer, the melt flow rate increases significantly, but the Izod impact at 23° C. and −30° C. decreases undesirably. The addition of S-1-octadecyl-S'-(α,α'-dimethyl-α''-acetic acid)-trithiocarbonate with 500 ppm peroxide demonstrated in inventive Examples 18-20 show how the melt flow rate can be increased with minimal decreases in Izod impact performance at 23° C. returning to partial and non-break failures and improved Izod impact performance at −30° C. The use of S-1-octadecyl-S'-(α,α'-dimethyl-α''-acetic acid)-trithiocarbonate with 1,000 ppm peroxide shown in Examples 21-23 demonstrate further increases in melt flow rate while the Izod impact performance at 23° C. and −30° C. is also increased.

EXAMPLE 14

The following example demonstrates the production of a modified heterophasic polyolefin composition created by melt mixing a polypropylene homopolymer, a polyolefin elastomer, an organic peroxide, and a compatibilizing agent according to the present invention. In particular, a 2 dg/min polypropylene homopolymer (Total Petrochemicals 3276), 20 w/w % of a polyolefin elastomer (Engage™ 7467 from The Dow Chemical Company), an organic peroxide (Varox DBPH available from R.T. Vanderbilt Company) and S-1-dodecyl-S'-(α,α'-dimethyl-a''-acetic acid)-trithiocarbonate were melt mixed and tested. The resulting composition was compared to the compositions obtained when the heterophasic polyolefin composition was compounded alone and with peroxide only.

The loadings of the peroxide and S-1-dodecyl-S'-(α,α'-dimethyl-α''-acetic acid)-trithiocarbonate are listed in Table 10. Each of the polymer compositions was mixed, extruded, and injection molded according to the procedure described above. The bars were then subjected to melt flow rate measurement and Izod impact testing as described above.

TABLE 10

Heterophasic polyolefin composition formed during melt mixing.

| Sample | CA Loading (Molar ratio CA:Peroxide) | CA Loading (ppm) | Melt Flow Rate (g/10 min) | Izod impact at 23° C. (J/m) |
|---|---|---|---|---|
| Unmodified Resin | — | — | 2.5 | Non-Break |
| 1000 ppm Peroxide Only | — | — | 26.8 | 71.4 |
| Ex. 24 | 4:1 | 9,066 | 6.9 | Non-Break |

The virgin blend of the polypropylene homopolymer and the polyolefin elastomer exhibits non-break Izod impact behavior at 23° C., but has an undesirably low melt flow rate. When peroxide is added to the blend, the melt flow rate increases substantially, but the 23° C. Izod Impact Strength is undesirably reduced from a non-break to 71.4 J/m. Surprisingly, when S-1-dodecyl-S'-(α,α'-dimethyl-α''-acetic acid)-trithiocarbonate is added at a 9,066 ppm loading, as demonstrated in Example 24, the melt flow rate remains high, and the 23° C. Izod Impact Strength exhibits non-break behavior. Thus, the invention composition (Example 24) achieves a desirable balance of high melt flow rate and high Izod Impact Strength performance.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A heterophasic polymer composition comprising:
(a) a propylene polymer phase comprising propylene polymers selected from the group consisting of polypropylene homopolymers and copolymers of propylene and up to 50 wt. % of one or more comonomers selected from the group consisting of ethylene and $C_4$-$C_{10}$ α-olefin monomers;
(b) an ethylene polymer phase comprising ethylene polymers selected from the group consisting of ethylene homopolymers and copolymers of ethylene and one or more $C_3$-$C_{10}$ α-olefin monomers; and
(c) a compatibilizing agent, wherein the compatibilizing agent is a compound comprising at least one moiety conforming to the structure of Formula (I)

(I)

2. The heterophasic polymer composition of claim 1, wherein the compatibilizing agent is selected from the group consisting of compounds conforming to the structure of Formula (X)

(X)

wherein $R_{10}$ is a group selected from the group consisting of aryl groups, substituted aryl groups, heterocyclyl groups, substituted heterocyclyl groups, heteroaryl groups, substituted heteroaryl groups, —S—$R_{51}$, —O—$R_{51}$, and —N($R_{51}$)($R_{52}$); $R_{51}$ and $R_{52}$ are independently selected from the group consisting of alkyl groups, substituted alkyl groups, aryl groups, substituted aryl groups, heteroaryl groups, and substituted heteroaryl groups; $R_{11}$, $R_{12}$, and $R_{13}$ are independently selected from the group consisting of hydrogen, cyano, alkyl groups, substituted alkyl groups, aryl groups, substituted aryl groups, —C(O)—O—$R_{61}$, and —$R_{65}$—C(O)—O—$R_{61}$; $R_{61}$ is selected from the group consisting of hydrogen, alkyl groups, substituted alkyl groups, heterocyclyl groups, substituted heterocyclyl groups, aryl groups, and substituted aryl groups; R65 is selected from the group consisting of alkyl groups; and provided no more than two of $R_{11}$, $R_{12}$, and $R_{13}$ are hydrogen.

3. The heterophasic polymer composition of claim 1, wherein the ethylene polymers are selected from the group consisting of ethylene-propylene elastomers, ethylene-butene elastomers, ethylene-hexene elastomers, ethylene-octene elastomers, and mixtures thereof.

4. The heterophasic polymer composition of claim 1, wherein the ethylene polymer comprises from 5 to 80 wt. % of the heterophasic polyolefin polymer composition, based on the total weight of propylene polymers and ethylene polymers in the composition.

5. The heterophasic polymer composition of claim 4, wherein the ethylene polymer comprises about 5 to 60 wt. % of the heterophasic polyolefin polymer composition, based on the total weight of propylene polymers and ethylene polymers in the composition.

6. The heterophasic polymer composition of claim 1, wherein the propylene content of the propylene polymer phase is 80 wt. % or greater.

7. The heterophasic polymer composition of claim 1, wherein the ethylene polymer phase is a discontinuous phase in the heterophasic polyolefin polymer composition.

8. The heterophasic polymer composition of claim 1, wherein the compatibilizing agent is present in the heterophasic polyolefin polymer composition in a concentration of from 10 ppm to 5 wt. %, based on the total weight of the composition.

9. A heterophasic polymer composition comprising a continuous phase comprising polypropylene polymers selected from the group consisting of polypropylene homopolymers and copolymers of propylene and up to 80 wt. % of one or more comonomers selected from the group consisting of ethylene and $C_4$-$C_{10}$ α-olefin monomers and a discontinuous phase comprising elastomeric ethylene copolymers having an ethylene content of from 8 to 90 wt. % selected from the group consisting of copolymers of ethylene and one or more $C_3$-$C_{10}$ α-olefin monomers, provided that the propylene content of the propylene polymer phase is greater than the propylene content of the ethylene polymer phase, wherein the composition further comprises propylene polymers bonded to ethylene copolymers by a compatibilizing agent, wherein the compatibilizing agent is a compound comprising at least one moiety conforming to the structure of Formula (I)

(I)

10. The heterophasic polymer composition of claim 9, wherein the discontinuous phase comprises from 5 to 35 wt. % of the heterophasic polyolefin polymer composition, based on the weight of propylene polymers and ethylene copolymers in the composition.

11. The heterophasic polymer composition of claim 9, wherein the ethylene copolymer comprising the discontinuous phase has an ethylene content of from 8 to 80 wt. %.

12. The heterophasic polymer composition of claim 9, wherein the heterophasic polyolefin polymer composition comprises from 5 to 30 wt. % ethylene, based on the total weight of propylene polymers and ethylene copolymers in the composition.

13. The heterophasic polymer composition of claim 9, wherein the heterophasic polyolefin polymer composition is obtained by operating in at least two polymerization stages.

14. The heterophasic polymer composition of claim 9, wherein the propylene content of the propylene polymer phase is 80 wt. % or greater.

15. The heterophasic polymer composition of claim 9, wherein the compatibilizing agent is present in the heterophasic polyolefin polymer composition in a concentration of from 10 ppm to 5 wt. %, based on the total weight of the composition.

16. A heterophasic polyolefin polymer composition obtained by the process comprising the steps of:
(a) providing a propylene polymer phase comprising propylene polymers selected from the group consisting of polypropylene homopolymers and copolymers of propylene and up to 50 wt. % of one or more comonomers selected from the group consisting of ethylene and $C_4$-$C_{10}$ α-olefin monomers and an ethylene polymer phase comprising ethylene polymers selected from the group consisting of ethylene homopolymers and copolymers of ethylene and one or more $C_3$-$C_{10}$ α-olefin monomers provided that the ethylene content of the ethylene polymer phase is at least 8 wt. %,
(b) providing a compatibilizing agent, wherein the compatibilizing agent is a compound comprising at least one moiety conforming to the structure of Formula (I)

(I)

and
(c) mixing the propylene polymer phase, the ethylene polymer phase and the compatibilizing agent in the presence of free carbon radicals, whereby propylene polymers are bonded to ethylene polymers by the compatibilizing agent, and whereby the propylene polymer phase and the ethylene polymer phase form a heterophasic composition.

17. The heterophasic polymer composition of claim 16, wherein the propylene polymer phase, the ethylene polymer phase and the compatibilizing agent are mixed in the presence of free carbon radicals by melt compounding, and the composition is heterophasic at 25° C.

18. The heterophasic polymer composition of claim 16, wherein the propylene polymer phase is the continuous phase and the propylene content of the propylene polymer phase is 80 wt. % or greater, and the ethylene polymer phase is the discontinuous phase and the ethylene polymers have an ethylene content of from 8 to 80 wt. % and are selected from the group consisting of copolymers of ethylene and one or more $C_3$-$C_{10}$ α-olefin monomers.

19. A method of making a heterophasic polyolefin polymer composition, the method comprising the steps of:
(a) providing a propylene polymer phase comprising propylene polymers selected from the group consisting of polypropylene homopolymers and copolymers of propylene and up to 50 wt. % of one or more comonomers selected from the group consisting of ethylene and $C_4$-$C_{10}$ α-olefin monomers, and an ethylene polymer phase comprising ethylene polymers selected from the group consisting of ethylene homopolymers and copolymers of ethylene and one or more $C_3$-$C_{10}$ α-olefin monomers provided that the ethylene content of the ethylene polymer phase is at least 8 wt. %,
(b) providing a compatibilizing agent, wherein the compatibilizing agent is a compound comprising at least one moiety conforming to the structure of Formula (I)

(I)

and
(c) mixing the propylene polymer phase, the ethylene polymer phase and the compatibilizing agent, in the presence of free carbon radicals, whereby the compatibilizing agent reacts with propylene polymers and ethylene polymers thereby bonding propylene polymers to ethylene polymers, and whereby the propylene polymer phase and the ethylene polymer phase form a heterophasic composition.

20. The method of claim 19, wherein the propylene polymer phase, the ethylene polymer phase and the compatibilizing agent are mixed in the presence of free carbon radicals by melt compounding, and the composition is heterophasic at 25° C.

21. The method of claim 19, wherein the propylene polymer phase is the continuous phase and the propylene content of the propylene polymer phase is 80 wt. % or greater, and the ethylene polymer phase is the discontinuous phase and the ethylene polymers have an ethylene content of from 8 to 80 wt. % and are selected from the group consisting of copolymers of ethylene and one or more $C_3$-$C_{10}$ α-olefin monomers.

22. The method of claim 19, wherein the polypropylene phase and the ethylene phase are provided to the mixture as a heterophasic impact copolymer obtained by operating in at least two polymerization stages.

23. The method of claim 19, wherein the compatibilizing agent is present in the heterophasic polyolefin polymer composition in a concentration of from 10 ppm to 5 wt. %, based on the total weight of the composition, and wherein a reaction between the compatibilizing agent and the ethylene polymer is conducted in the presence of a free radical generator selected from the group consisting of organic peroxides incorporating one or more peroxide bonds, and the compatibilizing agent and the organic peroxide are present in a ratio of moles of compatibilizing agent to molar equivalents of peroxide bonds of 1:10 to 10:1.

* * * * *